(12) United States Patent

Mashita et al.

(10) Patent No.: US 11,427,029 B2
(45) Date of Patent: Aug. 30, 2022

(54) PNEUMATIC TIRE AND CROSSLINKED RUBBER COMPOSITION

(71) Applicant: SUMITOMO RUBBER INDUSTRIES, LTD., Kobe (JP)

(72) Inventors: Ryo Mashita, Kobe (JP); Hiroyuki Kishimoto, Kobe (JP); Ryota Kitago, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 15/767,911

(22) PCT Filed: Oct. 21, 2016

(86) PCT No.: PCT/JP2016/081362
§ 371 (c)(1),
(2) Date: Apr. 12, 2018

(87) PCT Pub. No.: WO2017/073491
PCT Pub. Date: May 4, 2017

(65) Prior Publication Data
US 2018/0297405 A1 Oct. 18, 2018

(30) Foreign Application Priority Data

Oct. 27, 2015 (JP) .................. 2015-211345
Oct. 27, 2015 (JP) .................. 2015-211346

(51) Int. Cl.
*B60C 1/00* (2006.01)
*C08L 9/00* (2006.01)
(Continued)

(52) U.S. Cl.
CPC .............. *B60C 1/0016* (2013.01); *B60C 1/00* (2013.01); *B60C 11/00* (2013.01); *C08L 9/00* (2013.01);
(Continued)

(58) Field of Classification Search
CPC ........... B60C 1/0016; B60C 2011/0016; B60C 2011/0025
See application file for complete search history.

(56) References Cited

U.S. PATENT DOCUMENTS 5,569,697 A * 10/1996 Ferrandino ........... B60C 1/0016
524/492
5,703,165 A * 12/1997 Brands ..................... C08K 3/06
525/189

(Continued)

FOREIGN PATENT DOCUMENTS

CN 1572828 A 2/2005
EP 0824567 B1 7/1999
(Continued)

OTHER PUBLICATIONS

International Search Report for PCT/JP2016/081362 (PCT/ISA/210) dated Jan. 17, 2017.
(Continued)

*Primary Examiner* — Justin R Fischer
(74) *Attorney, Agent, or Firm* — Birch, Stewart, Kolasch & Birch LLP (57) ABSTRACT

A pneumatic tire includes bead cores, a carcass ply, an inner liner, and a tread having a volume of the low density region of 35% or more at elongation by an applied stress of 1.5 MPa, a volume of the void portion of 7.5% or less at elongation by an applied stress of 3.0 MPa and a hardness of 65 or more and the crosslinked rubber composition of the present invention having a volume of the low density region of 35% or more at elongation by an applied stress of 1.5 MPa, a volume of the void portion of 7.5 or less at elongation by an applied stress of 3.0 MPa and a hardness of 65 or more are excellent in abrasion resistance.

32 Claims, 2 Drawing Sheets

(51) Int. Cl.
B60C 11/00 (2006.01)
C08L 9/06 (2006.01)

(52) U.S. Cl.
CPC .......... *C08L 9/06* (2013.01); *B60C 2011/0016* (2013.01); *C08L 2205/025* (2013.01); *C08L 2205/03* (2013.01)

(56) References Cited

U.S. PATENT DOCUMENTS

| | | | |
|---|---|---|---|
| 6,194,509 | B1 | 2/2001 | Lin et al. |
| 6,291,572 | B1* | 9/2001 | Brown .................... C08J 3/226 523/351 |
| 2004/0242750 | A1 | 12/2004 | Hirayama |
| 2007/0004845 | A1 | 1/2007 | Zhang et al. |
| 2008/0132644 | A1 | 6/2008 | Lapra et al. |
| 2009/0062455 | A1* | 3/2009 | Narita ..................... B60C 1/00 524/571 |
| 2010/0112259 | A1 | 5/2010 | Cruse et al. |
| 2012/0116002 | A1 | 5/2012 | Cruse et al. |
| 2014/0011944 | A1* | 1/2014 | Kondo ..................... C08L 9/00 524/526 |
| 2015/0126674 | A1 | 5/2015 | Sato |
| 2016/0237259 | A1* | 8/2016 | Hardy ..................... C08L 15/00 |

FOREIGN PATENT DOCUMENTS

| | | |
|---|---|---|
| EP | 2871211 A1 | 5/2015 |
| JP | 7-118444 A | 5/1995 |
| JP | 2000-510178 A | 8/2000 |
| JP | 2000-336214 A | 12/2000 |
| JP | 2007-99950 A | 4/2007 |
| JP | 2009-074069 A | 4/2009 |
| JP | 2009-085732 A | 4/2009 |
| JP | 2010-018716 A | 1/2010 |
| JP | 2011-246527 A | 12/2011 |
| JP | 2012-149175 A | 8/2012 |
| JP | 2014-12798 A | 1/2014 |
| JP | 2015-124241 A | 7/2015 |
| JP | 2015-134925 A | 7/2015 |
| JP | 2017-083182 A | 5/2017 |
| WO | WO 97/42256 A1 | 11/1997 |
| WO | WO 2006/069793 A1 | 7/2006 |
| WO | WO 2010/059402 A1 | 5/2010 |

OTHER PUBLICATIONS

Extended European Search Report, dated Feb. 26, 2019, for European Application No. 16859721.9.
Chinese Office Action and Search Report, dated Nov. 29, 2019, for Chinese Application No. 201680060352.3 with an English translation.

* cited by examiner

FIG. 1 though a hardness of a crosslinked rubber composition is high, good results cannot be obtained from measurement of abrasion resistance of this crosslinked rubber composition and a rubber product thereof.
PNEUMATIC TIRE AND CROSSLINKED RUBBER COMPOSITION

TECHNICAL FIELD

The present invention relates to a pneumatic tire and a crosslinked rubber composition.

BACKGROUND OF THE INVENTION

It is known that generally a crosslinked rubber composition used for a tire tread is excellent in steering stability as its hardness becomes higher (for example, Patent Document 1, etc.). Further, it is known that as rigidity of a tire tread portion becomes higher, a car can turn a curve at a small rudder angle, and therefore, a lateral force applied to the tread portion is decreased, thus enhancing breaking resistance of a tire and abrasion resistance.

However, a higher hardness does not necessarily lead to excellent breaking resistance and abrasion resistance, and there is an exception. Namely, sometimes there is a phenomenon such that though a hardness of a crosslinked rubber composition is high, good results cannot be obtained from measurement of abrasion resistance of this crosslinked rubber composition and a rubber product thereof.

In order to make a mechanism of causing such an exception clear, breakage and friction phenomena have been observed by means of various methods. However, the mechanism has not been made clear completely.

Meanwhile, an X-ray computerized tomography is known as a technology for analyzing a material constituting a solid sample and a low density region contained in an inside thereof. For example, Patent Document 2 describes a method of visually analyzing a material constituting a friction member and a low density region contained inside thereof. However, analyzing a sample material in a state, such as elongated, of being applied with an external energy or analyzing a density of the material is not described in Patent Document 2.

PATENT DOCUMENTS

Patent Document 1: JP 2011-246527 A
Patent Document 2: JP 2009-085732 A

SUMMARY OF THE INVENTION

Problem to be Solved by the Invention

An object of the present invention is to provide a pneumatic tire and a crosslinked rubber composition being excellent in abrasion resistance.

Means to Solve the Problem

The inventors of the present invention have made intensive studies, and as a result, have found that growth of cracking generated inside a crosslinked rubber composition can be inhibited and abrasion resistance can be enhanced more by increasing a low density region at elongation by an applied stress of 1.5 MPa, decreasing a void portion at elongation by an applied stress of 3.0 MPa and making a hardness high, and thus have completed the present invention.

Namely, the present invention relates to a pneumatic tire comprising bead cores provided on a pair of right and left bead portions, respectively, a carcass ply extending from a crown portion to the both bead portions through both side wall portions and moored to the bead cores, an inner liner disposed at an inner side than the carcass ply in a direction of a tire diameter, and a tread disposed at an outer side than the carcass ply in a direction of a tire diameter and having a volume of the low density region of 35% or more at elongation by an applied stress of 1.5 MPa, a volume of the void portion of 7.5% or less at elongation by an applied stress of 3.0 MPa and a hardness of 65 or more.

Further, the present invention relates to a crosslinked rubber composition having a volume of the low density region of 35% or more at elongation by an applied stress of 1.5 MPa, a volume of the void portion of 7.5% or less at elongation by an applied stress of 3.0 MPa and a hardness of 65 or more.

It is preferable that the rubber component is a rubber component comprising one or more of rubber components comprising a conjugated diene compound.

It is preferable that the above-mentioned low density region is a region having a density of 0.1 to 0.8 time the density of a crosslinked rubber composition before the elongation.

It is preferable that the above-mentioned void portion is a region having a density of 0 to 0.1 time the density of a crosslinked rubber composition before the elongation.

It is preferable that a method of evaluating volumes of the low density region and the void portion is an X-ray computerized tomography.

It is preferable that a decay time of a phosphor for converting the X-ray into a visible light is 100 ms or less.

It is preferable that a luminance of the X-ray is $10^{10}$ photons/s/mrad$^2$/mm$^2$/0.1% bw or more.

Effect of the Invention

According to the pneumatic tire of the present invention comprising a tread having a large volume of the low density region at elongation by an applied stress of 1.5 MPa, a small volume of the void portion at elongation by an applied stress of 3.0 MPa and a high hardness, and to the crosslinked rubber composition of the present invention having a large volume of the low density region at elongation by an applied stress of 1.5 MPa, a small volume of the void portion at elongation by an applied stress of 3.0 MPa and a high hardness, it is possible to provide a pneumatic tire and a crosslinked rubber composition being excellent in abrasion resistance.

EMBODIMENT FOR CARRYING OUT THE INVENTION

The crosslinked rubber composition of the present invention is a crosslinked rubber composition having a large volume of the low density region at elongation by an applied stress of 1.5 MPa, a small volume of the void portion at elongation by an applied stress of 3.0 MPa and a high hardness. It is noted that the crosslinked rubber composition as used herein is a rubber composition subjected to crosslinking using a vulcanizing agent and an organic peroxide.

Rubber Component

The rubber component is not limited particularly, and among rubber components including diene rubbers such as isoprene rubber, butadiene rubber (BR), styrene-butadiene rubber (SBR), styrene-isoprene-butadiene rubber (SIBR), chloroprene rubber (CR) and acrylonitrile-butadiene rubber (NBR), and butyl rubber, which have been used in a rubber industry, one or more thereof can be appropriately selected and used. In particular, it is preferable that the rubber component comprises one or more of rubber components comprising a conjugated diene compound, and a rubber component comprising SBR and BR is preferable from the viewpoint of a balance of fuel efficiency, abrasion resistance, durability and wet grip performance.

SBR is not limited particularly, and examples thereof include an emulsion-polymerized SBR (E-SBR), a solution-polymerized SBR (S-SBR) and the like. The SBR may be oil-extended or may not be oil-extended. Further, a terminal-modified S-SBR and a main chain-modified S-SBR which have enhanced capability to interact with a filler can also be used. These SBRs may be used alone or may be used in combination of two or more thereof.

A styrene content of the SBR is preferably not less than 16% by mass, more preferably not less than 20% by mass, further preferably not less than 25% by mass, particularly preferably not less than 30% by mass, from the viewpoint of grip performance. When the styrene content is too large, styrene groups become in proximity to each other, a polymer becomes too hard and crosslinking becomes non-uniform, which may deteriorate blowing property during running at high temperature, and further there is a tendency that since temperature dependency of the performances is increased and the performances can be changed largely with respect to a temperature change, stable grip performance cannot be obtained at a middle/latter stage of running. Therefore, the styrene content is preferably not more than 60% by mass, more preferably not more than 50% by mass, further preferably not more than 40% by mass. It is noted that the styrene content of the SBR as used herein is calculated in accordance with 1H-NMR measurement.

A vinyl content of the SBR is preferably not less than 10%, more preferably not less than 15%, from the viewpoint of Hs of the crosslinked rubber composition and grip performance. On the other hand, from the viewpoint of grip performance, EB (durability) and abrasion resistance, the vinyl content of the SBR is preferably not more than 90%, more preferably not more than 80%, further preferably not more than 70%, particularly preferably not more than 60%. It is noted that the vinyl content of the SBR (an amount of 1,2-bond butadiene unit) as used herein can be determined by an infrared absorption spectrum analysis method.

A glass transition temperature (Tg) of the SBR is preferably not lower than −45° C., more preferably not lower than −40° C. The Tg is preferably not higher than 10° C., and the Tg is more preferably not higher than 5° C. from the viewpoint of prevention of a crack due to embrittlement during a winter season in the Temperate Zone. It is noted that a glass-transition temperature of the SBR as used herein is a value measured by conducting a differential scanning calorimetry measurement (DSC) under the condition of a temperature elevation rate of 10° C./minute in accordance with JIS K 7121.

A weight-average molecular weight (Mw) of the SBR is preferably not less than 700,000, more preferably not less than 900,000, further preferably not less than 1,000,000 from the viewpoint of grip performance and blowing property. On the other hand, the weight-average molecular weight is preferably not more than 2,000,000, more preferably not more than 1,800,000 from the viewpoint of blowing property. It is noted that the weight-average molecular weight of the SBR as used herein can be calibrated with standard polystyrene based on measurement values determined with a gel permeation chromatography (GPC) (GPC-8000 series manufactured by Tosoh Corporation; detector: differential refractometer; column: TSKGEL SUPERMALT-PORE HZ-M manufactured by Tosoh Corporation).

An SBR content in the rubber component is preferably not less than 30% by mass, more preferably not less than 40% by mass, for the reason that a sufficient grip performance can be obtained. On the other hand, the SBR content is preferably not more than 90% by mass, more preferably not more than 85% by mass, further preferably not more than 80/a % by mass, from the viewpoint of abrasion resistance, grip performance and fuel efficiency.

Particularly for the reason that higher grip performance and blowing property can be exhibited, it is preferable that the rubber component comprises 40% by mass or more of SBR having a styrene content of 16 to 60% by mass, and it is more preferable that the rubber component comprises 50% by mass or more of SBR having a styrene content of 25 to 55% by mass.

The BR is not limited particularly, and for example, BRs (high-cis BRs) having a high-cis content such as BR1220 available from ZEON CORPORATION, and BR130B and BR150B available from Ube Industries, Ltd.; modified BRs such as BR1250H available from ZEON CORPORATION; BRs having syndiotactic polybutadiene crystal such as VCR412 and VCR617 available from Ube Industries, Ltd.; BRs (rare-earth BRs) synthesized using a rare-earth element catalyst such as BUNA-CB25 available from LANXESS Japan, and the like can be used. These BRs may be used alone or may be used in combination of two or more thereof. Particularly high-cis BRs and rare-earth BRs are preferable from the viewpoint of processability and excellent abrasion resistance and breaking resistance.

When the rubber component comprises the BR, a content of the BR in the rubber component is preferably not less than 10% by mass, more preferably not less than 15% by mass, further preferably not less than 20% by mass, from the viewpoint of abrasion resistance, grip performance and fuel efficiency. Further, the content of the BR is preferably not more than 70% by mass, more preferably not more than 60% by mass, from the viewpoint of abrasion resistance, grip performance and fuel efficiency.

The above-mentioned filler can be optionally selected from those which have been usually used in a crosslinked rubber composition, and carbon black and silica are preferable.

Examples of the carbon black include furnace black, acetylene black, thermal black, channel black, graphite and the like and these carbon blacks may be used alone or may be used in combination with two or more thereof. Among them, furnace black is preferable for the reason that low temperature characteristics and abrasion resistance can be enhanced in good balance.

A nitrogen adsorption specific surface area ($N_2SA$) of the carbon black is preferably not less than 70 $m^2/g$, more preferably not less than 90 $m^2/g$, from the viewpoint that sufficient reinforcing property and abrasion resistance can be obtained. Further, the $N_2SA$ of the carbon black is preferably not more than 300 $m^2/g$, more preferably not more than 250 $m^2/g$, from the viewpoint of excellent dispersibility and a property of being hard to generate heat. It is noted that the $N_2SA$ of the carbon black as used herein is measured in accordance with JIS K6217-2 "Carbon black for rubber industry—Fundamental characteristics—Part 2: Determination of specific surface area—Nitrogen adsorption method—Single-point procedures".

When the rubber composition comprises the carbon black, the content thereof is preferably not less than 3 parts by mass, more preferably not less than 4 parts by mass, based on 100 parts by mass of the rubber component. When the content is less than 3 parts by mass, there is a tendency that a sufficient reinforcing property cannot be obtained. On the other hand, the content of the carbon black is preferably not more than 200 parts by mass, more preferably not more than 150 parts by mass, further preferably not more than 60 parts by mass. When the content is more than 200 parts by mass, there is a tendency that processability is lowered, heat generation is prone to arise and abrasion resistance is lowered.

Silica is not limited particularly, and there are, for example, silica prepared by a dry method (anhydrous silica) and silica prepared by a wet method (hydrous silica), and hydrous silica is preferred for the reason that many silanol groups are contained.

A nitrogen adsorption specific surface area ($N_2SA$) of the silica is preferably not less than 80 $m^2/g$, more preferably not less than 100 $m^2/g$, from the viewpoint of durability and an elongation at break. On the other hand, the $N_2SA$ of the silica is preferably not more than 250 $m^2/g$, more preferably not more than 220 $m^2/g$, from the viewpoint of fuel efficiency and processability. It is noted that the $N_2SA$ of the silica as used herein is a value measured in accordance with ASTM D3037-93.

When the rubber composition comprises the silica, the content of the silica is preferably not less than 5 parts by mass, more preferably not less than 10 parts by mass based on 100 parts by mass of the rubber component, from the viewpoint of durability and an elongation at break. On the other hand, the content of the silica is preferably not more than 200 parts by mass, more preferably not more than 150 parts by mass, from the viewpoint of enhancing dispersibility during kneading and for inhibiting lowering of processability due to re-agglomeration of silica during heating at rolling and during storage after rolling.

When the rubber composition comprises the silica, it is preferable that the silica is used in combination with a silane coupling agent. Any silane coupling agent which has been used in combination with silica in the rubber industry can be used as the silane coupling agent, and examples thereof include sulfide silane coupling agents such as Si75, Si266 (bis(3-triethoxysilylpropyl)disulfide) manufactured by Evonik Degussa and Si69 (bis(3-triethoxysilylpropyl)tetrasulfide) manufactured by Evonik Degussa; mercapto silane coupling agents (mercapto group-containing silane coupling agents) such as 3-mercaptopropyltrimethoxysilane, and NXT-Z100, NXT-Z45 and NXT manufactured by Momentive Performance Materials; vinyl silane coupling agents such as vinyltriethoxysilane; amino silane coupling agents such as 3-aminopropyltriethoxysilane; glycidoxy silane coupling agents such as γ-glycidoxypropyltriethoxysilane; nitro silane coupling agents such as 3-nitropropyltrimethoxysilane; and chloro silane coupling agents such as 3-chloropropyltrimethoxysilane. These silane coupling agents may be used alone or may be used in combination with two or more thereof. Among them, sulfide silane coupling agents and mercapto silane coupling agents are preferable from the viewpoint of their strong binding force with silica and excellent low heat build-up characteristic.

When the rubber composition comprises the silane coupling agent, the content of the silane coupling agent is preferably not less than 2 parts by mass, more preferably not less than 3 parts by mass based on 100 parts by mass of the silica. When the content of the silane coupling agent is less than 2 parts by mass, there is a tendency that an effect of improving dispersion of the silica is not obtained sufficiently. On the other hand, the content of the silane coupling agent is preferably not more than 25 parts by mass, more preferably not more than 20 parts by mass. When the content of the silane coupling agent exceeds 25 parts by mass, an effect for a cost tends not to be obtained.

In addition to the above-mentioned components, the crosslinked rubber composition according to the present invention can comprise compounding agents generally used in manufacturing crosslinked rubber composition, for example, a resin component, oils, zinc oxide, stearic acid, antioxidants, wax, sulfur donator, a vulcanizing agent, a vulcanization accelerator and the like.

The crosslinked rubber composition according to the present invention is characterized in that the volume of the low density region when extended by an applied stress of 1.5 MPa is 35% or more, the volume of the void portion when extended by an applied stress of 3.0 MPa is 7.5% or less, and the hardness measured with a type A durometer is 65 or more. The hardness is one measured with a type A durometer in accordance with the test method of JIS K6253 "Rubber, vulcanized or thermoplastic—Determination of hardness".

In a crosslinked rubber composition having a large volume of the low density region, a crosslinking structure thereof is highly uniform, and therefore, a stress is not concentrated in a specific region and is dispersed. A crosslinked rubber composition having a small region of the generated void portion is excellent in durability against an external stress such as breaking resistance and abrasion resistance. Further, in a crosslinked rubber composition having a high hardness, an abrupt deformation when a stress is generated can be inhibited. The crosslinked rubber composition according to the present invention can realize high abrasion resistance since the volume of the low density region when extended by an applied stress of 1.5 MPa is large, the volume of the void portion when extended by an applied stress of 3.0 MPa is small, and a hardness is high.

The volume of the low density region when extended by an applied stress of 1.5 MPa is preferably 40% or more. On the other hand, the volume of the low density region when extended by an applied stress of 1.5 MPa is preferably 95% or less.

The volume of the void portion when extended by an applied stress of 3.0 MPa is preferably 7.0% or less.

In order to realize the condition such that the volume of the low density region when extended by an applied stress of 1.5 MPa is 35% or more and the volume of the void portion when extended by an applied stress of 3.0 MPa is 7.5% or less, it is necessary to make a crosslinked state in the rubber composition uniform. Example of a means for making a crosslinked state in the rubber composition uniform include a method of increasing a kneading time or increasing the number of kneading steps, thereby making a dispersed state of a vulcanizing agent and/or a vulcanization accelerator uniform.

The low density region and the void portion will be explained below. First, if a stress applied to the crosslinked rubber composition exceeds an inherent critical value of the crosslinked rubber composition, a deviation in density in the crosslinked rubber composition arises, thereby generating a low density region inside thereof. There are a reversible portion and an irreversible portion in this low density region.

The reversible portion is a low density region to be generated in the case where an applied stress is small (1.5 MPa), and disappears by a release of the stress and an original uniform density distribution is recovered. Here, the low density region to be generated in the case where an applied stress is small is a region wherein a density is not less than 0.1 time an average density of the crosslinked rubber composition before extended and not more than 0.8 time an average density of the crosslinked rubber composition before extended. The rubber test piece can be evaluated in good accuracy by evaluating the distribution of this reversible portion.

The irreversible portion is a low density region to be generated in the case where an applied stress is large (3.0 MPa), in which an inner structure of the crosslinked rubber composition (bonding of molecular chains) is partially broken by the stress and even after the stress is released, the low density region is left without recovering an original state. Here, in the irreversible portion, the void portion is a region where the inner structure was broken extremely and a density is not less than 0 time an average density of the crosslinked rubber composition before extended and not more than 0.8 time an average density of the crosslinked rubber composition before extended. The rubber test piece can be evaluated in good accuracy by evaluating the distribution of this void portion.

A method of evaluating the volume of the low density region when extended by an applied stress of 1.5 MPa and the volume of the void portion when extended by an applied stress of 3.0 MPa is not limited particularly as far as a density distribution of the crosslinked rubber composition when extended can be evaluated, and an evaluation method using an X-ray computerized tomography is preferable.

Figure 1:
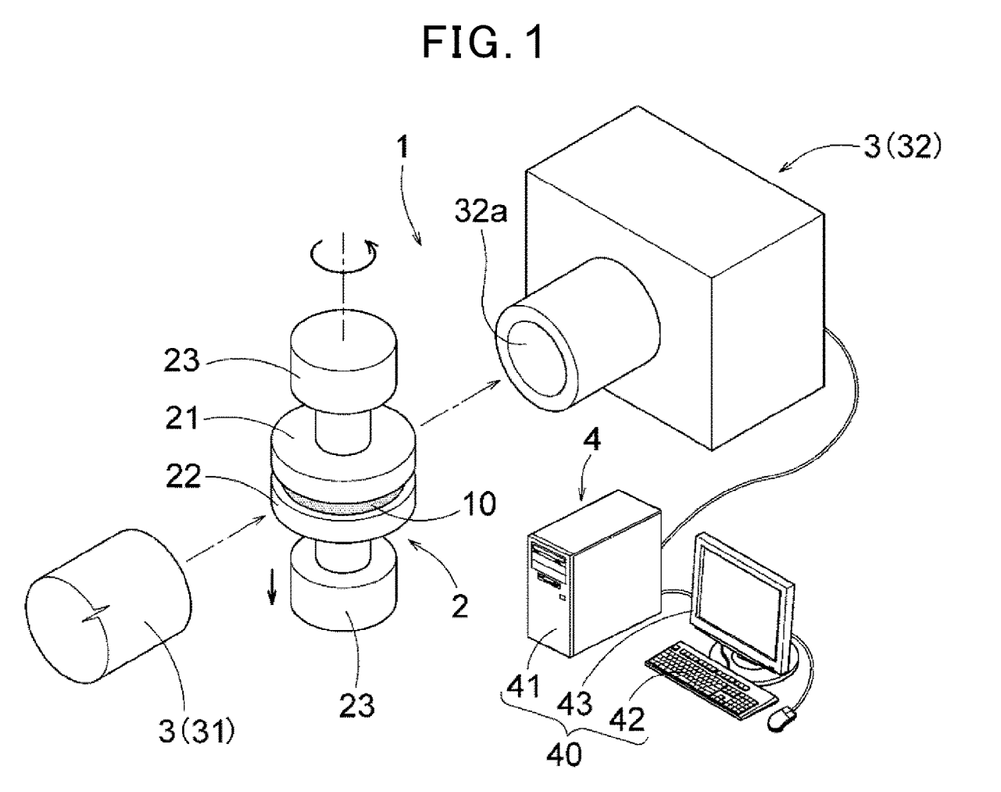
FIG. 1 is a schematic perspective view of an example of an evaluation device for evaluating a density distribution of a crosslinked rubber composition at elongation thereof.

The evaluation method of a density distribution of the crosslinked rubber composition when extended using an X-ray computerized tomography will be described by referring to the attached drawings. FIG. 1 is a schematic perspective view of an example of an evaluation device to be used for the evaluation method. The evaluation device 1 as shown in FIG. 1 comprises a stress application means 2, a photographing means 3 and an evaluation means 4.

The stress application means 2 applies a stress for extending the rubber test piece 10 to generate a low density region inside the rubber test piece 10.

It is preferable that the stress application means 2 comprises a pair of jigs 21, 22 for fixing the test piece 10 and a drive means 23 for moving the jig 21 and the jig 22 relatively to each other, thereby applying a stress to the test piece 10. With the one jig 21 being fixed, the drive means 23 allows another jig 22 to move in an axial direction of the test piece 10. Thus, a stress for extending the test piece 10 in its axial direction is applied.

The stress applied to the test piece 10 is detected with a load cell (not shown) or the like. A position and a type of the load cell are selected optionally. A predetermined stress is applied to the rubber test piece 10 with the stress application means 2. The drive means 23 is configured to enable the rubber test piece 10 and the jigs 21, 22 to be rotated relative to the axis of the rubber test piece 10.

The photographing means 3 irradiates an X-ray onto the test piece 10 to take a projection image. The photographing means 3 has an X-ray tube 31 for irradiating an X-ray and a detector 32 for detecting the X-ray and converting it into an electric signal. While the rubber test piece 10 and the jigs 21, 22 being rotated relative to the axis of the rubber test piece 10, the photographing means 3 photographs plural projection images and the projection images of the whole perimeter of the test piece 10 can be obtained.

The detector 32 has a phosphor 32a for converting an X-ray into a visible light. A decay time of the phosphor 32a is preferably 100 ms or less. In the case where the decay time of the phosphor 32a exceeds 100 ms, when photographing plural projection images continuously while rotating the test piece 10 and others relative to the axis of the test piece 10, a residual image of the previously photographed projection image may have an adverse effect on a projection image to be photographed thereafter. From this point of view, the decay time of the phosphor 32a is more desirably 50 ms or less, further desirably 10 ms or less.

The evaluation means 4 evaluates performance of the crosslinked rubber composition based on the density distribution determined from the projection image. To the evaluation means 4, for example, a computer 40 is applied. The computer 40 comprises a main body 41, a keyboard 42 and a display device 43. This main body 41 is provided with storage devices such as a central processing unit (CPU), an ROM, an operation memory and a hard disc. A process procedure (program) for performing a simulation method according to this embodiment has been stored in the storage devices beforehand.

Figure 2:
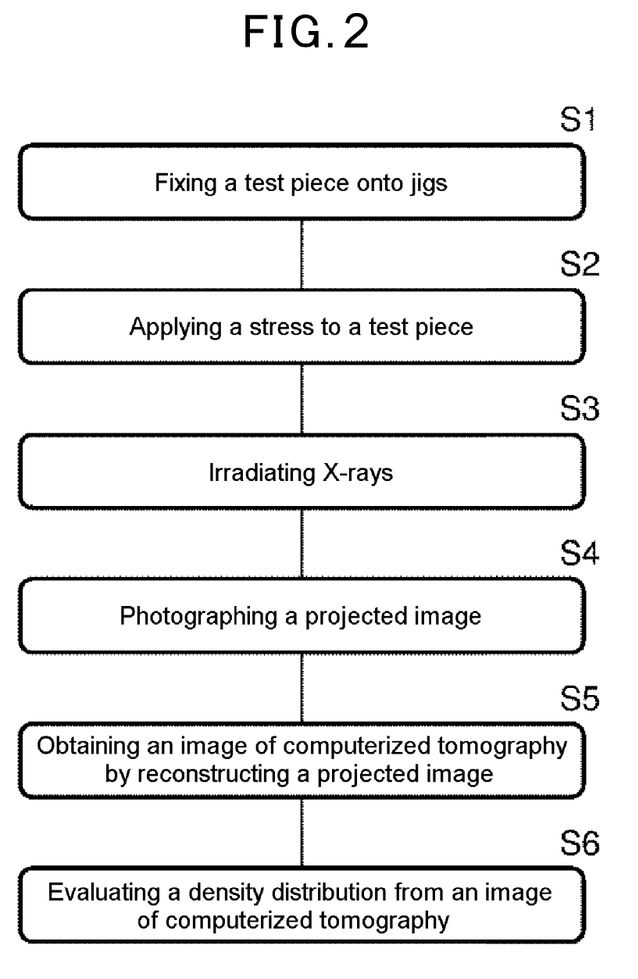
FIG. 2 is a flow chart showing steps of procedure of an evaluation method of a density distribution of a crosslinked rubber composition at extension thereof.

FIG. 2 is a flow chart showing a process procedure of an evaluation method of a density distribution of a crosslinked rubber composition at elongation thereof using the evaluation device 1. The evaluation method of a density distribution includes steps S1 and S2 for applying a stress to the test piece 10 to generate a deviation of density (a low density region) inside the rubber test piece 10, photographing steps S3 and S4 for irradiating the rubber test piece 10 with an X-ray and photographing a projection image, and evaluation steps S5 and S6 for evaluating a density distribution of the crosslinked rubber composition based on a density distribution determined from the projection images.

In the step S1, the rubber test piece 10 is fixed to the jigs 21, 22.

A shape of the rubber test piece 10 is not limited particularly, but is preferably in a form of a column or a rectangular parallelepiped, more preferably in a form of a column for the reason that the rubber test piece 10 has symmetry and that measurement results being high in reproducibility can be easily obtained.

The rubber test piece 10 has a diameter which is preferably five times, more preferably ten times, further preferably twenty times the length in its axial direction. According to such test piece 10, a deformation of a side surface of the rubber test piece 10 is restricted when a stress is applied to the rubber test piece 10. As a result, a volume of the rubber test piece 10 increases and a very large stress is applied inside the rubber test piece 10. Therefore, a low density region is prone to be generated inside the test piece 10, and evaluation of performance of an elastic material can be performed rapidly and easily.

The rubber test piece 10 is fixed to the both jigs 21, 22 in a state of being interposed therebetween. The top surface of the rubber test piece 10 is fixed to the bottom surface of the jig 21, and the bottom surface of the test piece 10 is fixed to top surface of the jig 22. The fixing method can be selected adequately depending on a test environment and the like. For example, fixing with an adhesive or fixing by adhesion due to vulcanization of an elastic material constituting the test piece 10 can be applied. Further, the test piece 10 may be fixed to the jigs 21, 22 by providing corresponding engaging parts on the top surface and the bottom surface and the bottom surface and the top surface, respectively and connecting the engaging parts.

In the step S2, as shown in FIG. 1, the jig 21 and the jig 22 move in an axial direction of the rubber test piece 10, namely the jig 22 moves in a direction apart from the jig 21, thereby extending the rubber test piece 10. If the stress exceeds a critical value of the crosslinked rubber composition, there arises a deviation of density in the rubber test piece 10 and a low density region is generated inside the test piece 10.

In the present invention, a stress for extending the test piece 10 in order to determine a distribution of a low density region to be generated with a small applied stress is 1.5 MPa. Further, a stress for extending the test piece 10 in order to determine a distribution of a void portion which is, among low density regions to be generated with a large applied stress, a region having an inside structure extremely destroyed is 3.0 MPa.

In the step S3, X-rays are irradiated onto the rubber test piece 10 from the X-ray tube 31. The X-rays passes through the rubber test piece 10 and are detected by the detector 32. The detector 32 converts the detected X-rays into an electric signal and outputs the electric signal to the computer 40.

A luminance of the X-rays irradiated from the X-ray tube 31 onto the rubber test piece 10 is greatly related to an S/N ratio of X-ray scattering data. In the case where the luminance of X-rays is small, there is a tendency that a signal strength is weaker than a statistical error of X-rays, and even if a measuring time is increased, it may be difficult to obtain data showing a sufficiently good S/N ratio. From this point of view, the luminance of X-rays is preferably $10^{10}$ photons/s/mrad$^2$/mm$^2$/0.1% bw or more.

In the step S4, the electric signal outputted from the detector 32 is processed by the computer 40 to obtain a projection image.

In the step S5, the projection image is reconstructed by the computer 40 to obtain a three-dimensional tomogram of the rubber test piece 10. Then in the step S6, the density distribution of the crosslinked rubber composition when extended can be evaluated from the tomogram, and volumes of the reversible portion and the void portion can be obtained.

As mentioned above, the hardness of the crosslinked rubber composition of the present invention measured with a type A durometer is 65 or more.

The hardness is preferably 68 or more, more preferably 70 or more. A preferable upper limit of the hardness is 80. When the hardness is not more than 80, followability of the rubber to a road surface is improved and wet grip performance can be maintained.

Examples of a means for realizing a hardness of 65 or more include adjustment of a sulfur amount, an amount of a plasticizer such as oil and a filler amount. By increasing a sulfur amount or a filler amount, the hardness can be increased, and by increasing a plasticizer amount, the hardness can be decreased.

The crosslinked rubber composition of the present invention can be prepared by a usual method as far as the crosslinked rubber composition exhibiting the above-mentioned volume of a low density region and volume of a void portion when extended and the above-mentioned hardness can be obtained. The crosslinked rubber composition can be prepared, for example, by a method of kneading the above-mentioned components other than the vulcanizing agent and the vulcanization accelerator with a generally well-known kneading machine such as a Banbury mixer, a kneader or an open roll and then adding the vulcanizing agent and the vulcanization accelerator followed by further kneading and then conducting vulcanization, or by other method.

For the reason that a crosslinked state of the crosslinked rubber composition can be made uniform and a rubber composition having many low density regions when extended and a small volume of a void portion when extended is easily obtained, preferred is a preparation method including a step of initiating kneading of a rubber component, a sulfur donator and a sulfur atom-containing vulcanization accelerator and subsequently adding a filler to the obtained kneaded product and kneading at a temperature of 120° C. or higher.

The sulfur donator is, for example, an elementary sulfur or a sulfur compound releasing an active sulfur under vulcanization conditions (for example, 150° C., 1.5 MPa) or under a temperature and pressure lower than them. In other words, this sulfur compound is a compound generally exhibiting a function as a vulcanizing agent under the vulcanization conditions (for example, 150° C., 1.5 MPa) or under a temperature and pressure lower than them. It is noted that this released active sulfur forms a part of a pendant structure described later.

The above-mentioned sulfur atom-containing vulcanization accelerator indicates a vulcanization accelerator including a sulfur atom bonded to other molecule by a single bond. Among sulfur atom-containing vulcanization accelerators, there are those releasing an active sulfur and those not releasing an active sulfur, and from the viewpoint of inhibiting advancement of a crosslinking reaction during the kneading, sulfur atom-containing vulcanization accelerators not releasing an active sulfur are preferable.

By initiating the kneading of the rubber component, the sulfur donator and the sulfur atom-containing vulcanization accelerator before kneading the rubber component and the filler, adsorption of the sulfur donator and the sulfur atom-containing vulcanization accelerator by the filler can be prevented and therefore, the sulfur donator and the sulfur atom-containing vulcanization accelerator can be dispersed in the rubber component efficiently. In the above-mentioned preparation method, the filler is added to a kneaded product obtained by kneading the rubber component, the sulfur donator and the sulfur atom-containing vulcanization accelerator, followed by kneading at a kneading temperature of 120° C. or higher. The active sulfur is released from the sulfur donator under the kneading temperature of 120° C. or higher and a mechanical shearing force during the kneading. The sulfur donator, the sulfur atom-containing vulcanization accelerator and the rubber component react with each other, which leads to a state of the whole or a part of the sulfur atom-containing vulcanization accelerator (hereinafter referred to as "vulcanization accelerator residue") being bonded to the rubber component, namely a state of a pendant structure being formed, in which "—S-vulcanization accelerator residue" is bonded to the rubber component. In this reaction mechanism, it is conjectured that the released active sulfur reacts with the sulfur atom of the sulfur atom-containing vulcanization accelerator to form a structure having two or more bonded sulfur atoms and the structure portion reacts with the double bond portion of the rubber component. By kneading in a state that the pendant structure is formed, the rubber component and the vulcanization accelerator residue move together, and therefore, uniformity of a dispersed state of the vulcanization accelerator residue can be enhanced in the entire rubber composition. Thus, in the above-mentioned preparation method, uniformity of a crosslinking density at the time of vulcanization can be enhanced. It is noted that the kneading temperature as used herein is an actually measured temperature of the rubber composition in the kneading machine, and a surface temperature of the rubber composition can be measured with a non-contact type temperature sensor or the like.

The preparation method is featured, for example, by a point that the kneading of the rubber component, the sulfur donator and the sulfur atom-containing vulcanization accelerator is initiated before kneading the filler and a point that after adding the filler, kneading is performed at the kneading temperature of 120° C. or higher. As far as the above-mentioned requirements are satisfied, any materials may be added in any step. For example, in the case where the kneading step comprises two steps including a step X and a step F, the kneading step may be such that kneading of the rubber component, the sulfur donator and the sulfur atom-containing vulcanization accelerator is initiated at an initial stage of the step X, the filler is added in the midst of the step X, and kneading is conducted at the kneading temperature of 120° C. or higher, and thereafter, the step F is performed. Further, for example, in the case where the kneading step comprises three steps including the step X, a step Y and the step F, the kneading step may be such that kneading of the rubber component, the sulfur donator and the sulfur atom-containing vulcanization accelerator is initiated in the step X, the filler is added in the following step Y and kneading is conducted at the kneading temperature of 120° C. or higher, and thereafter, the step F is performed. Further, example of other kneading step including three steps may be such that kneading of the rubber component, the sulfur donator and the sulfur atom-containing vulcanization accelerator is initiated at an initial stage of the step X, the filler is added in the midst of the step X and kneading is conducted at the kneading temperature of 120° C. or higher, and thereafter, the step Y and the step F are performed, or may be such that kneading of the rubber component, the sulfur donator and the sulfur atom-containing vulcanization accelerator is initiated at an initial stage of the step X, the filler is added in the midst of the step X, the filler is further added and kneading is conducted at the kneading temperature of 120° C. or higher in the following step Y, and thereafter, the step F is performed. It is noted that re-milling may be performed between the respective steps.

The temperature of kneading the rubber component, the sulfur donator and the sulfur atom-containing vulcanization accelerator is not limited particularly. The kneading temperature is preferably lower than 160° C., more preferably 150° C. or lower from the viewpoint of inhibiting the crosslinking reaction by the sulfur donator and the sulfur atom-containing vulcanization accelerator from proceeding.

Further, the kneading time of the rubber component, the sulfur donator and the sulfur atom-containing vulcanization accelerator before adding the filler to the rubber component is not limited particularly. The kneading time is, for example, 10 seconds or more from the viewpoint of enhancement of dispersibility.

The kneading temperature after addition of the filler is preferably 170° C. or lower from the viewpoint of inhibiting the crosslinking reaction from progressing excessively.

Further, the kneading time after addition of the filler to the rubber component and reach of the kneading temperature to 120° C. is not limited particularly, and from the viewpoint of enhancement of dispersibility, is, for example, two minutes or more. Here, the kneading time is a time from a point of time when the kneading temperature reached 120° C. after addition of the filler to the rubber component up to a point of time when all the steps of the kneading step has been completed. For example, when the kneading temperature reached 120° C. after addition of the filler to the rubber component in the step X, the kneading time is a time from this point of time up to a point of time when the step F is completed.

As mentioned above, an elementary sulfur and/or the above-mentioned sulfur compound releasing active sulfur can be used as the sulfur donator. Examples of the elementary sulfur include powdered sulfur, precipitated sulfur, colloidal sulfur, surface-treated sulfur, insoluble sulfur, and the like.

If too much amount of elementary sulfur is compounded as the sulfur donator, the vulcanization reaction may progress excessively in the kneading step. Therefore, even when the elementary sulfur is used as the sulfur donator, a content thereof is preferably 0.1 part by mass or less based on 100 parts by mass of the rubber component. On the other hand, the content is preferably 0.05 part by mass or more from the viewpoint of a breaking strength.

Examples of the sulfur compound functioning as the sulfur donator include polymeric polysulfide represented by -(-M-S—C—)$_n$— and a compound which has a structure —S$_n$— (n≥2) having two or more of sulfur atoms bonded by a single bond and releases an active sulfur. Examples of this compound include alkylphenol disulfide, morpholine disulfide, thiuram vulcanization accelerators having —S$_n$— (n≥2) (tetramethylthiuram disulfide (TMTD), tetraethylthiuram disulfide (TETD), tetrabutylthiuram disulfide (TBTD), dipentamethylenethiuram disulfide (DPTT), and the like), vulcanization accelerators such as 2-(4'-morpholinodithio) benzothiazole (MDB) and polysulfide silane coupling agent (for example, Si69 (bis(3-triethoxysilylpropyl)tetrasulfide) manufactured by Degussa AG), and a sulfide compound represented by the following formula (1), (2) or (3).

(1)

wherein R's are the same or different, and represent monovalent hydrocarbon groups which have 3 to 15 carbon atoms and may have a substituent, and n represents an integer of 2 to 6.

$R^1$s in the above formula (1) are monovalent hydrocarbon groups which have 3 to 15 carbon atoms and may have a substituent, and the number of carbon atoms is preferably from 5 to 12, more preferably from 6 to 10. The monovalent hydrocarbon groups $R^1$ may be either of a straight-chain, a branched chain or a cyclic one, and may be either of a saturated or unsaturated hydrocarbon group (an aliphatic, alicyclic or aromatic hydrocarbon group or other group). Among these, aromatic hydrocarbon groups which may have a substituent are preferable.

Examples of preferred R's include an $C_{3-15}$ alkyl group, a substituted $C_{3-15}$ alkyl group, a $C_{3-15}$ cycloalkyl group, a substituted $C_{3-15}$ cycloalkyl group, an $C_{3-15}$ aralkyl group, a substituted $C_{3-15}$ aralkyl group and the like, and among these, the aralkyl group and the substituted aralkyl group are preferable. Here, examples of the alkyl group include a butyl group and an octyl group, an example of the cycloalkyl group includes a cyclohexyl group, and examples of the aralkyl group include a benzyl group and a phenethyl group. Examples of a substituent include polar groups such as an oxo group (=O), a hydroxyl group, a carboxyl group, a carbonyl group, an amino group, an acetyl group, an amide group and an imide group.

Further, "n" in the formula (1) is an integer of from 2 to 6, and 2 or 3 is preferable.

(2)

wherein $R^2$s are the same or different, and represent divalent hydrocarbon groups which have 3 to 15 carbon atoms and may have a substituent, and "m" represents an integer of 2 to 6.

In the above formula (2), $R^2$s are divalent hydrocarbon groups which have 3 to 15 carbon atoms and may have a substituent, and the number of carbon atoms is preferably from 3 to 10, more preferably from 4 to 8. The divalent hydrocarbon group $R^2$ may be either of a straight-chain, a branched chain or a cyclic one, and may be either of a saturated or unsaturated hydrocarbon group (an aliphatic, alicyclic or aromatic hydrocarbon group or other group). Among these, aliphatic hydrocarbon groups which may have a substituent are preferable, and straight-chain aliphatic hydrocarbon groups are more preferable.

Examples of the $R^2$s include an $C_{3-15}$s alkylene group, a substituted $C_{3-15}$ alkylene group and the like. Here, examples of alkylene groups include a butylene group, a pentylene group, a hexylene group, a heptylene group, an octylene group, a nonylene group and the like, and examples of the substituent include the same substituents as in $R^1$.

Further, "m" in the formula (2) is an integer of from 2 to 6, and 2 or 3 is preferable.

Examples of the sulfide compounds represented by the above-mentioned formula (1) or (2) include N,N'-di(γ-butyrolactam)disulfide, N,N'-di(5-methyl-γ-butyrolactam)disulfide, N,N'-di(5-ethyl-γ-butyrolactam)disulfide, N,N'-di(5-isopropyl-γ-butyrolactam)disulfide, N,N'-di(5-methoxyl-γ-butyrolactam)disulfide, N,N'-di(5-ethoxyl-γ-butyrolactam)disulfide, N,N'-di(5-chloro-γ-butyrolactam)disulfide, N,N'-di(5-nitro-γ-butyrolactam)disulfide, N,N'-di(5-amino-γ-butyrolactam)disulfide, N,N'-di(δ-balerolactam)disulfide, N,N'-di(δ-caprolactam)disulfide, N,N'-di(ε-caprolactam)disulfide, N,N'-di(3-methyl-δ-caprolactam)disulfide, N,N'-di(3-ethyl-ε-caprolactam)disulfide, N,N'-di(3-isopropyl-ε-caprolactam)disulfide, N,N'-di(8-methoxy-ε-caprolactam)disulfide, N,N'-di(3-ethoxy-ε-caprolactam)disulfide, N,N'-di(3-chloro-ε-caprolactam)disulfide, N,N'-di(8-nitro-ε-caprolactam)disulfide, N,N'-di(3-amino-ε-caprolactam)disulfide, N,N'-di(ω-heptalactam)disulfide, N,N'-di(ω-octalactam)disulfide, dithiodicaprolactam, morpholine disulfide, N-benzyl-N-[(dibenzylamino)disulfanyl]phenylmethanamine (N,N'-dithiobis(dibenzylamine)), and the like. These sulfide compounds may be used alone or may be used in combination of two or more thereof.

(3)

wherein $R^3$s are the same or different, and represent an alkyl group, a benzothiazolyl group, an amino group, a morpholino group, a dialkylthiocarbamoyl group or a group represented by the following formula (4). "k" represents an integer of 2 to 6.

(4)

wherein $R^4$s are the same or different, and represent an alkyl group, a benzothiazolylsulfide group, a cycloalkyl group or a hydrogen atom.

$R^3$s in the above formula (3) are the same or different, and represent an alkyl group, a benzothiazolyl group, an amino group, a morpholino group, a dialkylthiocarbamoyl group or a group represented by the above formula (4). Among these, preferable are an alkyl group having 1 to 10 carbon atoms, a benzothiazolyl group, an amino group, a morpholino group or a dialkylthiocarbamoyl group (The alkyl groups are the same or different, and are alkyl groups having 1 to 10 carbon atoms.).

Examples of the alkyl group having 1 to 10 carbon atoms and alkyl groups having 1 to 10 carbon atoms in the dialkylthiocarbamoyl group include methyl, ethyl, n-propyl, isopropyl, n-butyl, iso-butyl, sec-butyl, tert-butyl, pentyl, hexyl, heptyl, 2-ethylhexyl, octyl, nonyl and the like.

Examples of more preferable $R^3$s in the above formula (3), which are the same or different, include a benzothiazolyl group, a morpholino group and a dialkylthiocarbamoyl group (The alkyl groups are the same or different, and are alkyl groups having 1 to 5 carbon atoms.). Examples of further preferable $R^3$s in the above formula (3), which are the same or different, include a benzothiazolyl group or a dialkylthiocarbamoyl group (The alkyl groups are the same or different, and are alkyl groups having 1 to 5 carbon atoms.).

"k" in the formula (3) is an integer of from 2 to 6, and 2 or 3 is further preferable.

$R^4$s in the above formula (4) are the same or different, and each of them is an alkyl group, a benzothiazolylsulfide group, a cycloalkyl group or a hydrogen atom. The alkyl group is preferably an alkyl group having 1 to 10 carbon atoms, and the cycloalkyl group is preferably a cycloalkyl group having 1 to 5 carbon atoms.

Examples of the sulfide compound represented by the formula (3) include tetramethylthiuram disulfide, tetramethylthiuram disulfide, tetrabutylthiuram disulfide, 2-(morpholinodithio)benzothiazol, dibenzothiazolyl disulfide, N-cycohexyl-2-benzothiazolylsulfeneamide and the like, and dibenzodithiazolyl disulfide can be used suitably. These may be used alone or may be used in combination with two or more thereof.

When using the sulfur compound functioning as the sulfur donator, a content thereof is preferably not less than 0.1 part by mass, more preferably not less than 0.2 part by mass based on 100 parts by mass of the rubber component for the reason that formation of a pendant type structure is accelerated. On the other hand, the content is preferably not more than 5 parts by mass, more preferably not more than 3 parts by mass, further preferably not more than 2 parts by mass from the viewpoint of inhibiting gelation during the kneading.

The vulcanization accelerator functioning as the sulfur donator include vulcanization accelerators having sulfur atom bonded to other molecule by a single bond. Therefore, the sulfur atom-containing vulcanization accelerators functioning as the sulfur donator have both functions of the sulfur donator and the sulfur atom-containing vulcanization accelerators, and also by compounding much amount of a single sulfur atom-containing vulcanization accelerator functioning as the sulfur donator or by combination use of two or more of such vulcanization accelerators, formation of a pendant type structure is possible. However, when compounding much amount of the sulfur atom-containing vulcanization accelerator functioning as the sulfur donator, a crosslinking reaction may progress excessively during the kneading, and when compounding a small amount of the sulfur atom-containing vulcanization accelerator functioning as the sulfur donator, an effect of making a crosslinking density uniform may be hard to obtain. Therefore, it is preferable that the sulfur donator and the sulfur atom-containing vulcanization accelerator which are kneaded before addition of the filler are a sulfur donator (a sulfur atom-containing vulcanization accelerator functioning as the sulfur donator and/or other sulfur donator) and a sulfur atom-containing vulcanization accelerator releasing no sulfur.

The sulfur atom-containing vulcanization accelerator releasing no sulfur is a sulfur atom-containing vulcanization accelerator which does not release sulfur under vulcanization conditions (for example, 150° C., 1.5 MPa) or under a temperature and pressure lower than the vulcanization conditions. In other words, this sulfur atom-containing vulcanization accelerator releasing no sulfur is a sulfur atom-containing vulcanization accelerator not exhibiting a function as a vulcanizing agent under vulcanization conditions (for example, 150° C., 1.5 MPa) or under a temperature and pressure lower than the vulcanization conditions.

Examples of the sulfur atom-containing vulcanization accelerator releasing no sulfur include thiazole-based vulcanization accelerators (2-mercaptobenzothiazole (MBT), zinc salt of 2-mercaptobenzothiazole (ZnMBT), cyclohexylamine salt of 2-mercaptobenzothiazole (CMBT) and the like); sulfenamide-based vulcanization accelerators (N-cyclohexyl-2-benzothiazolylsulfenamide (CBS), N-(tert-butyl)-2-benzothiazolyl sulfenamide (TBBS), N,N-dicyclohexyl-2-benzothiazolyl sulfenamide, and the like); vulcanization accelerators of tetramethylthiuram monosulfide (TMTM); dithiocarbamate-based vulcanization accelerators (piperidinium pentamethylene dithiocarbamate (PPDC), zinc dimethyldithiocrbamate (ZnMDC), zinc diethyldithiocarbamate (ZnEDC), zinc dibutyldithiocarbamate (ZnBDC), zinc N-ethyl-N-phenyldithiocarbamate (ZnEPDC), zinc N-pentamethylenedithiocarbamate (ZnPDC), sodium dibutyldithiocarbamate (NaBDC), copper dimethyldithiocarbamate (CuMDC), iron dimethyldithiocarbamate (FeMDC), tellurium diethyldithiocarbamate (TeEDC) and the like); and the like. It is noted that di-2-benzothiazolyl sulfenamide (MBTS) being a thiazole-based vulcanization accelerator has —$S_n$— (n≥2) and is a sulfur-releasing vulcanization accelerator, but does not exhibit a function as a vulcanizing agent against a natural rubber and a butadiene rubber in the case of a usual compounding amount, and therefore, can be used equivalently to a sulfur atom-containing vulcanization accelerator releasing no sulfur.

A content of the sulfur atom-containing vulcanization accelerator is preferably not less than 1.0 part by mass, more preferably not less than 1.5 parts by mass based on 100 parts by mass of the rubber component for the reason that a vulcanization reaction progresses efficiently in the vulcanization step. On the other hand, the content is preferably not more than 5 parts by mass, more preferably not more than 3 parts by mass from the viewpoint of inhibiting scorching and precipitation on a surface of the rubber.

In the above-mentioned preparation method, it is preferable that after adding the filler to the rubber component and kneading at a kneading temperature of 120° C. or higher, an additional sulfur donator is further kneaded. By adding the additional sulfur donator, while inhibiting the crosslinking reaction from progressing excessively during the kneading, the crosslinking reaction can be progressed sufficiently during the vulcanization.

The additional sulfur donator is added in the following step F after adding the filler to the rubber component and kneading at a kneading temperature of 120° C. or higher. The additional sulfur donator may be the same kind of sulfur donator as one kneaded before adding the filler to the rubber component or may be a separate kind of sulfur donator. Examples thereof include elementary sulfur such as powdered sulfur, precipitated sulfur, colloidal sulfur, surface-treated sulfur, insoluble sulfur, or the like.

A content of the additional sulfur donator is not limited particularly, and is preferably not less than 0.5 part by mass, more preferably not less than 0.8 part by mass based on 100 parts by mass of the rubber component for the reason that a vulcanization reaction progresses efficiently in the vulcanization step. On the other hand, the content is preferably not more than 3.0 parts by mass, more preferably not more than 2.5 parts by mass for the reason that abrasion resistance is excellent.

When adding the additional sulfur donator in the step F, a usual vulcanizing accelerator may be added. Examples of the usual vulcanizing accelerator include thiuram-based disulfides and polysulfides being sulfur atom-containing vulcanization accelerators; guanidine-, aldehyde-amine-, aldehyde-ammonia- and imidazoline-based vulcanization accelerators being vulcanization accelerators having no sulfur atom; and the like.

A content of the vulcanization accelerator to be added in the step F is preferably not less than 0.1 part by mass based on 100 parts by mass of the rubber component. A mass ratio of a compounding amount of the vulcanization accelerator to be added in the step F to a compounding amount of the sulfur atom-containing vulcanization accelerator to be kneaded before adding the filler to the rubber component is preferably higher than 0% and not more than 80%, further preferably not more than 60%. When the mass ratio is not more than 80%, a crosslinked rubber composition inhibiting scorching and having excellent breaking resistance and abrasion resistance can be obtained.

The crosslinked rubber composition of the present invention can be used not only for tire members such as a tread, an under tread, a carcass, a side wall and a bead of a tire but also a vibration-proof rubber, a belt, a hose and other rubber products in a rubber industry. In particular, a tire having a tread composed of the crosslinked rubber composition of the present invention is preferable since it has excellent abrasion resistance.

A tire produced using the crosslinked rubber composition of the present invention can be produced by a usual method using an un-crosslinked rubber composition. Namely, the tire can be produced by subjecting an un-crosslinked rubber composition prepared by compounding the above-mentioned additives with the diene rubber component according to necessity, to extrusion processing to a shape of a tread or the like, and then laminating together with other tire members on a tire building machine and forming by a usual forming method, thus forming an unvulcanized tire, and heating and compressing this unvulcanized tire in a vulcanizer.

A structure of the pneumatic tire of the present invention is not limited particularly, and can be a structure of a conventional pneumatic tire. Namely, the pneumatic tire of the present invention can be made by using a member produced from the crosslinked rubber composition of the present invention on at least one of tire members constituting a pneumatic tire having a conventional structure. In particular, it is preferable that the pneumatic tire comprises bead cores provided on a pair of right and left bead portions, respectively; a carcass ply extending from a crown portion to the both bead portions through both side wall portions and moored to the bead cores; an inner liner disposed at an inner side than the carcass ply in a direction of a tire diameter; and a tread disposed at an outer side than the carcass ply in a direction of a tire diameter and having a volume of the low density region of 35% or more at elongation by an applied stress of 1.5 MPa, a volume of the void portion of 7.5% or less at elongation by an applied stress of 3.0 MPa and a hardness of 65 or more. It is noted that the above-mentioned tread is a portion coming into contact with a road surface and in the case where the tread is composed of two or more different crosslinked rubber compositions and at least one of the crosslinked rubber compositions is the crosslinked rubber composition of the present invention, an obtained tire is the tire of the present invention.

EXAMPLE

The present invention will be described based on Examples, but the present invention is not limited thereto only.

A variety of chemicals used in Examples and Comparative Examples will be explained below.
SBR1: prepared in accordance with a method of preparing a modified SBR1 mentioned later (S-SBR, styrene content: 26% by mass, vinyl content: 59%, Tg: −25° C., Mw: 4×10$^5$)
SBR2: Nipol 1502 (E-SBR, styrene content: 23.5% by mass, vinyl content: less than 20%, Tg: −54° C., Mw: 5×10$^5$) manufactured by ZEON CORPORATION
BR: BR150B manufactured by Ube Industries, Ltd.
Silica: ULTRASIL VN3 (N$_2$SA: 175 m$^2$/g) manufactured by Evonik Degussa
Silane coupling agent: Si266 (bis(3-triethoxysilylpropyl) disulfide) manufactured by Evonik Degussa
Carbon black: DIABLACK I (N$_2$SA: 98 m$^2$/g, DBP oil absorption: 124 ml/100 g) manufactured by Mitsubishi Chemical Corporation
Zinc oxide: Zinc Oxide No. 2 manufactured by Mitsui Mining & Smelting Co., Ltd.
Stearic acid: Stearic acid beads "Tsubaki" manufactured by NOF Corporation
Antioxidant: OZONONE 6C (N-(1,3-dimethylbutyl)-N-phenyl-p-phenylenediamine, 6PPD) manufactured by Seiko Chemical Co., Ltd.
Oil: Diana Process Oil AH-24 manufactured by Idemitsu Kosan Co., ltd.
Elementary sulfur: Powder sulfur manufactured by Tsurumi Chemical Industry Co., Ltd.
Vulcanization accelerator: Nocceler NS (TBBS N-tert-butyl-2-benzothiazolylsulfeneamide) manufactured by OUCHI SHINKO CHEMICAL INDUSTRIAL CO., LTD.
Sulfur donator: Rhenogran CLD80 (caprolactam disulfide) manufactured by Rhein Chemie Corporation
A variety of chemicals used in the preparation method of SBR1 will be explained below.
Cyclohexane: Cyclohexane manufactured by Kanto Chemical Industry Co., Ltd.
Pyrrolidine: Pyrrolidine manufactured by Kanto Chemical Industry Co., Ltd.
Divinylbenzene: Divinylbenzene manufactured by SIGMA-ALDRICH JAPAN
1.6M n-butyllithium hexane solution: 1.6M n-butyllithium hexane solution manufactured by Kanto Chemical Industry Co., Ltd.
Isopropanol: Isopropanol manufactured by Kanto Chemical Industry Co., Ltd.
Styrene: Styrene manufactured by Kanto Chemical Industry Co., Ltd.
Butadiene: 1,3-Butadiene manufactured by TAKACHIHO CHEMICAL INDUSTRIAL CO., LTD.
Tetramethylethylenediamine: N,N,N',N'-Tetramethylethylenediamine manufactured by Kanto Chemical Industry Co., Ltd.
Modifying agent: 3-(N,N-dimethylaminopropyl)trimethoxysilane manufacture by Azmax Co.
Preparation Method of SBR1
Into a 100 ml vessel having been subjected to replacement with nitrogen sufficiently were poured 50 ml of cyclohexane, 4.1 ml of pyrrolidine and 8.9 ml of divinylbenzene, and 0.7 ml of 1.6M n-butyllithium hexane solution was added to the mixture, followed by stirring at 0° C. One hour after, isopropanol was added to terminate the reaction, followed by extraction and refining to obtain Monomer-A. Subsequently into a 1,000 ml pressure resistant vessel having been subjected to replacement with nitrogen sufficiently were added 600 ml of cyclohexane, 12.6 ml of styrene, 71.0 ml of butadiene, 0.06 g of Monomer-A and 0.11 ml of tetramethylethylenediamine, and 0.2 ml of 1.6M n-butyllithium hexane solution was added to the mixture, followed by stirring at 40° C. Three hours after, 0.5 ml of a modifying agent was added, and the mixture was stirred. One hour after, 3 ml of isopropanol was added to terminate polymerization. After adding 1 g of 2,6-tert-butyl-p-cresol into a reaction solution, the solution was subjected to reprecipitation treatment with methanol, followed by drying by heating to obtain SBR1.

Examples 1 to 13 and Comparative Examples 1 to 3

According to compounding formulations shown in Tables 1 and 2, various chemicals shown in the step X were kneaded with a 1.7 L Banbury mixer at a discharge temperature of 100° C. for 5.0 minutes (step X). Subsequently the kneaded product obtained in the step X and various chemicals shown in the step Y were kneaded with a 1.7 L Banbury mixer at not less than 140° C. for 30 seconds and further kneaded at a discharge temperature of 150° C. for 3 minutes (step Y). Then, the kneaded product obtained in the step Y and various chemicals shown in the step F were kneaded with an open roll at about 80° C. for 3 minutes (step F) to obtain an unvulcanized rubber composition. The obtained unvulcanized rubber composition was extrusion-molded into a form of a tread using an extruder with an extrusion nozzle having a specific shape, and an extrudate was laminated with other tire members to form an unvulcanized tire, followed by press-vulcanization at 170° C. for 12 minutes to produce a test tire (tire size: 195/65R15). The following evaluations were made using the obtained test tires. The results of the evaluations are shown in Tables 1 and 2.
Volume of a Low Density Region
Rubber test pieces in a form of column having a diameter of 10 mm and a height of 1 mm were prepared by cutting tread portions of test tires, and each rubber test piece was fixed to the jigs shown in FIG. 1 and extension of the test piece was initiated. At the time when extended with an applied stress of 1.5 MPa, X-rays (luminance: $10^{16}$ photons/s/mrad$^2$/mm$^2$/0.1% bw) were irradiated and computerized tomography was conducted. A volume ratio of the low density region in the extended rubber test piece was calculated from a density distribution obtained from a three-dimensional tomogram prepared by reconstructing the photographed images. It is noted that the X-ray computerized tomography was performed in a large synchrotron radiation facility SPring-8 Beamline BL20B2, and P43(Gd$_2$O$_2$S: Tb), in which a decay time of a phosphor was 1 ms, was used as a phosphor. CT reconstruction was performed by a Convention Back Projection method by laminating 200 tomograms having a thickness of 10 μm. The low density region is a region having a density of 0.1 to 0.8 assuming that an average density of the rubber test piece before extended is 1.

Volume of Void Region

Rubber test pieces in a form of column having a diameter of 10 mm and a height of 1 mm were prepared by cutting tread portions of test tires, and each rubber test piece was fixed to the jigs shown in FIG. 1 and extension of the test piece was initiated. At the time when extended with an applied stress of 3.0 MPa, X-rays (luminance: $10^{16}$ photons/s/mrad$^2$/mm$^2$/0.1% bw) were irradiated and computerized tomography was conducted. A volume ratio of the void portion in the extended rubber test piece was calculated from a density distribution obtained from a three-dimensional tomogram prepared by reconstructing the photographed images. It is noted that the X-ray computerized tomography was performed in a large synchrotron radiation facility SPring-8 Beamline BL20B2, and P43(Gd$_2$O$_2$S: Tb), in which a decay time of a phosphor was 1 ms, was used as a phosphor. CT reconstruction was performed by a Convention Back Projection method by laminating 200 tomograms having a thickness of 10 μm. The void portion is a region having a density of 0 to 0.1 assuming that an average density of the rubber test piece before extended is 1.

Hardness

A hardness of a vulcanized rubber composition was measured with a type A durometer using each of rubber test pieces prepared by cutting tread portions of test tires in accordance with a test method in JIS K6253—Rubber, vulcanized or thermoplastic—Determination of hardness.

Abrasion Resistance

Each of the test tires produced in the same manner as above was loaded on four wheels of a domestic FF vehicle and after in-vehicle running of 8,000 km, a depth of the groove of each tire tread portion was measured. A traveling distance in which a groove depth of a tire was decreased by 1 mm was calculated from an arithmetic mean of the groove depths of four wheels. Assuming that an abrasion resistance index of Comparative Example 1 is 100, a result of each compounding formulation is indicated by an index with the following equation (abrasion resistance index). The larger the abrasion resistance index is, the more excellent the abrasion resistance is.

Abrasion resistance index=(Traveling distance when a tire groove depth is decreased by 1 mm)/(Traveling distance of Comparative Example 1 when a tire groove depth is decreased by 1 mm)×100

TABLE 1

| Compounding amount | Ex. | Com. Ex. | | |
|---|---|---|---|---|
| (part by mass) | 1 | 1 | 2 | 3 |
| Step X | | | | |
| SBR1 | 50 | 50 | 50 | 55 |
| SBR2 | 30 | 30 | 30 | 20 |
| BR | 20 | 20 | 20 | 25 |
| Vulcanization accelerator | 1 | — | — | 1 |
| Sulfur donator | 1.5 | — | — | 1.5 |
| Step Y | | | | |
| Silica | 70 | 70 | 70 | 70 |
| Silane coupling agent | 6 | 6 | 6 | 6 |
| Carbon black | 5 | 5 | 5 | 5 |
| Oil | 5 | 20 | 5 | 20 |
| Zinc oxide | 5 | 5 | 5 | 5 |
| Stearic acid | 3 | 3 | 3 | 3 |
| Antioxidant | 2 | 2 | 2 | 2 |
| Vulcanization accelerator | 1 | 1 | 1 | 1 |
| Sulfur donator | 1.5 | 1.5 | 1.5 | 1.5 |
| Step F | | | | |
| Sulfur | 1.5 | 1.5 | 1.5 | 1.5 |
| Vulcanization accelerator | — | 1 | 1 | — |
| Sulfur donator | — | 1.5 | 1.5 | — |
| Evaluation | | | | |
| Volume of low density region (%) | 65 | 23 | 23 | 65 |
| Volume of void portion (%) | 6.5 | 9.7 | 8.5 | 6.5 |
| Hardness | 70 | 60 | 71 | 59 |
| Abrasion resistance index | 146 | 100 | 109 | 130 |

TABLE 2

| Compounding amount | Example | | | | | | | | | | | |
|---|---|---|---|---|---|---|---|---|---|---|---|---|
| (part by mass) | 2 | 3 | 4 | 5 | 6 | 7 | 8 | 9 | 10 | 11 | 12 | 13 |
| Step X | | | | | | | | | | | | |
| SBR1 | 50 | 50 | 50 | 50 | 48 | 54 | 56 | 58 | 50 | 50 | 50 | 50 |
| SBR2 | 30 | 30 | 30 | 30 | 30 | 30 | 30 | 30 | 30 | 30 | 30 | 30 |
| BR | 20 | 20 | 20 | 20 | 22 | 1.6 | 14 | 12 | 20 | 20 | 20 | 20 |
| Vulcanization accelerator | 1 | 1 | 1 | 1 | 1 | 1 | 1 | 1 | 1 | 1 | 1 | 1 |
| Sulfur donator | 1.5 | 1.5 | 1.5 | 1.5 | 1.5 | 1.5 | 1.5 | 1.5 | 1.2 | 1.0 | 0.7 | 0.5 |
| Step Y | | | | | | | | | | | | |
| Silica | 70 | 70 | 70 | 70 | 70 | 70 | 70 | 70 | 70 | 70 | 70 | 70 |
| Silane coupling agent | 6 | 6 | 6 | 6 | 6 | 6 | 6 | 6 | 6 | 6 | 6 | 6 |
| Carbon black | 5 | 5 | 5 | 5 | 5 | 5 | 5 | 5 | 5 | 5 | 5 | 5 |
| Oil | 2 | 8 | 11 | 14 | 2 | 2 | 2 | 2 | 2 | 2 | 2 | 2 |
| Zinc oxide | 5 | 5 | 5 | 5 | 5 | 5 | 5 | 5 | 5 | 5 | 5 | 5 |
| Stearic acid | 3 | 3 | 3 | 3 | 3 | 3 | 3 | 3 | 3 | 3 | 3 | 3 |

TABLE 2-continued

| Compounding amount | Example | | | | | | | | | | | |
|---|---|---|---|---|---|---|---|---|---|---|---|---|
| (part by mass) | 2 | 3 | 4 | 5 | 6 | 7 | 8 | 9 | 10 | 11 | 12 | 13 |
| Antioxidant | 2 | 2 | 2 | 2 | 2 | 2 | 2 | 2 | 2 | 2 | 2 | 2 |
| Vulcanization accelerator | 1 | 1 | 1 | 1 | 1 | 1 | 1 | 1 | 1 | 1 | 1 | 1 |
| Sulfur donator | 1.5 | 1.5 | 1.5 | 1.5 | 1.5 | 1.5 | 1.5 | 1.5 | 1.2 | 1.0 | 0.7 | 0.5 |
| Step F | | | | | | | | | | | | |
| Sulfur | 1.5 | 1.5 | 1.5 | 1.5 | 1.5 | 1.5 | 1.5 | 1.5 | 1.6 | 1.7 | 1.8 | 1.9 |
| Vulcanization accelerator | — | — | — | — | — | — | — | — | — | — | — | — |
| Sulfur donator | — | — | — | — | — | — | — | — | — | — | — | — |
| Evaluation | | | | | | | | | | | | |
| Volume of low density region (%) | 70 | 60 | 50 | 40 | 70 | 60 | 50 | 40 | 65 | 65 | 65 | 65 |
| Volume of void portion (%) | 6.3 | 6.7 | 7.0 | 7.3 | 6.5 | 6.5 | 6.5 | 6.5 | 6.3 | 6.7 | 7.0 | 7.3 |
| Hardness | 72 | 69 | 67 | 65 | 70 | 70 | 70 | 70 | 70 | 70 | 70 | 70 |
| Abrasion resistance index | 154 | 135 | 121 | 117 | 149 | 128 | 124 | 120 | 148 | 129 | 127 | 125 |

Examples 14 to 16

According to compounding formulations, and discharge temperatures and times shown in Table 3, chemicals shown in the step X were kneaded with a 1.7 L Banbury mixer (step X). Subsequently the kneaded product obtained in the step X and chemicals shown in the step Y were kneaded with a 1.7 L Banbury mixer at discharge temperatures and times shown in Table 3 and further kneaded at a discharge temperature of 150° C. for 3 minutes (step Y). Then, the kneaded product obtained in the step Y and chemicals shown in the step F were kneaded with an open roll at discharge temperatures and times shown in Table 3 (step F) to obtain an unvulcanized rubber composition. The obtained unvulcanized rubber composition was extrusion-molded into a form of a tread using an extruder with an extrusion nozzle having a specific shape, and an extrudate was laminated with other tire members to form an unvulcanized tire, followed by press-vulcanization at 170° C. for 12 minutes to produce a test tire (tire size: 195/65R15). The following evaluations were made using the obtained test tires. The results of the evaluations are shown in Table 3.

TABLE 3

| Compounding amount | Example | | |
|---|---|---|---|
| (part by mass) | 14 | 15 | 16 |
| Step X | | | |
| SBR1 | 50 | 50 | 50 |
| SBR2 | 30 | 30 | 30 |
| BR | 20 | 20 | 20 |
| Kneading temperature (° C.) | 100 | 100 | 100 |
| Kneading time (min) | 5 | 5 | 5 |
| Step Y | | | |
| Silica | 70 | 70 | 70 |
| Silane coupling agent | 6 | 6 | 6 |
| Carbon black | 5 | 5 | 5 |
| Oil | 5 | 5 | 5 |
| Zinc oxide | 5 | 5 | 5 |
| Stearic acid | 3 | 3 | 3 |
| Antioxidant | 2 | 2 | 2 |
| Vulcanization accelerator | 1 | 1 | 1 |
| Sulfur donator | 1.5 | 1.5 | 1.5 |
| Kneading temperature (° C.) | 160 | 160 | 160 |
| Kneading time (min) | 5 | 7 | 10 |
| Step F | | | |
| Sulfur | 1.5 | 1.5 | 1.5 |
| Vulcanization accelerator | 1 | 1 | 1 |
| Sulfur donator | 1.5 | 1.5 | 1.5 |
| Kneading temperature (° C.) | 80 | 80 | 80 |
| Kneading time (min) | 5 | 7 | 10 |
| Evaluation | | | |
| Volume of low density region (%) | 64 | 64 | 64 |
| Volume of void portion (%) | 6.6 | 6.7 | 6.8 |
| Hardness | 68 | 67 | 65 |
| Abrasion resistance index | 145 | 143 | 142 |

From the results shown in Tables 1 to 3, it is seen that the pneumatic tire of the present invention including a tread having a large volume of the low density region at elongation by an applied stress of 1.5 MPa, a small volume of the void portion at elongation by an applied stress of 3.0 MPa and a high hardness, and the crosslinked rubber composition of the present invention having a large volume of the low density region at elongation by an applied stress of 1.5 MPa, a small volume of the void portion at elongation by an applied stress of 3.0 MPa and a high hardness, are the pneumatic tire and the crosslinked rubber composition, respectively being excellent in abrasion resistance.

EXPLANATION OF SYMBOLS

1 Evaluation device
2 Stress application means
3 Photographing means
4 Evaluation means

The invention claimed is:
1. A pneumatic tire comprising:
   bead cores provided on a pair of right and left bead portions, respectively;
   a carcass ply extending from a crown portion to the both bead portions through both side wall portions and moored to the bead cores;
   an inner liner disposed at an inner side than the carcass ply in a direction of a tire diameter; and
   a tread formed of a crosslinked rubber composition disposed at an outer side than the carcass ply in a direction of a tire diameter and having a volume of the low density region of 35% or more at elongation by an applied stress of 1.5 MPa, a volume of the void portion of 7.5% or less at elongation by an applied stress of 3.0 MPa and a hardness of 65 or more.

2. The pneumatic tire of claim 1, wherein the crosslinked rubber composition further comprises silica.

3. The pneumatic tire of claim 2, wherein a content of the silica is 5 to 200 phr.

4. The pneumatic tire of claim 1, wherein the crosslinked rubber composition further comprises a rubber component comprising styrene-butadiene rubber.

5. The pneumatic tire of claim 4, wherein a styrene content of the styrene-butadiene rubber is 16% to 60% by mass and a vinyl content of the styrene-butadiene rubber is 10% to 90%.

6. The pneumatic tire of claim 4, wherein a Tg of the styrene-butadiene rubber is from −54° C. to 10° C.

7. The pneumatic tire of claim 4, wherein a weight-average molecular weight of the styrene-butadiene rubber is from 400,000 to 2,000,000.

8. The pneumatic tire of claim 1, wherein the crosslinked rubber composition further comprises an oil.

9. The pneumatic tire of claim 1, wherein the crosslinked rubber composition further comprises a silane coupling agent.

10. The pneumatic tire of claim 9, further comprising silica,
wherein a content of the silane coupling agent is 2 to 25 parts by mass based on 100 parts by mass of the silica.

11. The pneumatic tire of claim 1, wherein the crosslinked rubber composition further comprises a rubber component comprising two kinds of styrene-butadiene rubber, and butadiene rubber.

12. The pneumatic tire of claim 11, wherein a content of the styrene-butadiene rubber in the rubber component is 30% by mass to 90% by mass.

13. The pneumatic tire of claim 11, wherein a content of the butadiene rubber in the rubber component is 10% by mass to 70% by mass.

14. The pneumatic tire of claim 1, wherein the crosslinked rubber composition further comprises emulsion-polymerized styrene-butadiene rubber and solution-polymerized styrene-butadiene rubber,
wherein a content of the emulsion-polymerized styrene-butadiene rubber is 30 parts by mass, and
wherein a content of the solution-polymerized styrene-butadiene rubber is 48 parts by mass to 58 parts by mass.

15. The pneumatic tire of claim 1, wherein the crosslinked rubber composition further comprises carbon black.

16. The pneumatic tire of claim 15, wherein a content of the carbon black is 3 to 200 phr based on 100 parts by mass of the rubber component.

17. The pneumatic tire of claim 1, wherein the crosslinked rubber composition further comprises:
styrene-butadiene rubber in the rubber component having a content of 30% by mass to 90% by mass;
butadiene rubber in the rubber component having a content of 10% by mass to 70% by mass,
wherein a styrene content of the styrene-butadiene rubber in the rubber component is 16% to 60% by mass and a vinyl content of the styrene-butadiene rubber is 10% to 90%;
carbon black having a content of 3 to 200 phr based on 100 parts by mass of the rubber component;
silica having a content of 5 to 200 phr;
silane coupling agent.

18. The pneumatic tire of claim 17, wherein a content of silane coupling agent is 2 to 25 parts by mass based on 100 parts by mass of the silica.

19. The pneumatic tire of claim 18, wherein the rubber component, a first portion of a sulfur donator and a first portion of a vulcanization accelerator are kneaded in a first step to form a first product;
wherein the first product and at least the silica, silane coupling agent, a second portion of the sulfur donator and a second portion of the vulcanization accelerator are kneaded in a second step to form a second product; and
wherein the second product and sulfur are added in a third step to form the crosslinked rubber composition.

20. A crosslinked rubber composition having a volume of the low density region of 35% or more at elongation by an applied stress of 1.5 MPa, a volume of the void portion of 7.5% or less at elongation by an applied stress of 3.0 MPa and a hardness is 65 or more.

21. The crosslinked rubber composition of claim 20, wherein the volume of the low density region at elongation by an applied stress of 1.5 MPa is 40% or more; and
wherein the volume of the void portion at elongation by an applied stress of 3.0 MPa is 7.3% or less.

22. The crosslinked rubber composition of claim 20, wherein the volume of the low density region at elongation by an applied stress of 1.5 MPa is 50% or more and wherein the volume of the void portion at elongation by an applied stress of 3.0 MPa is 7.0% or less.

23. The crosslinked rubber composition of claim 20, wherein the volume of the low density region at elongation by an applied stress of 1.5 MPa is 60% or more and wherein the volume of the void portion at elongation by an applied stress of 3.0 MPa is 6.7% or less.

24. The crosslinked rubber composition of claim 20, wherein the hardness is 68 or more.

25. The crosslinked rubber composition of claim 24, less comprising at least one sulfur donator selected from the group consisting of a sulfide compound represented by the following formula (1), (2) or (3) and a sulfur atom-containing vulcanization accelerator releasing no sulfur, $$\begin{array}{c}R^1\\ \diagdown\\ R^1 \end{array} N\!-\!\!\left(S\right)_{\!\!n}\!\!-\!N\begin{array}{c}R^1\\ \diagup\\ R^1\end{array} \qquad (1)$$

wherein each $R^1$ is the same or different, and represents a monovalent hydrocarbon group which has 3 to 15 carbon atoms and may have a substituent, and n represents an integer of 2 to 6, $$R^2\bigcirc N\!-\!\!\left(S\right)_{\!\!m}\!\!-\!N\bigcirc R^2 \qquad (2)$$

wherein each $R^2$ is the same or different, and represents a divalent hydrocarbon group which has 3 to 15 carbon atoms and may have a substituent, and "m" represents an integer of 2 to 6, $$R^3\!-\!\!\left(S\right)_{\!\!k}\!\!-\!R^3 \qquad (3)$$

wherein each $R^3$ is the same or different, and represents an alkyl group, a benzothiazolyl group, an amino group, a morpholino group, a dialkylthiocarbamoyl group or a group represented by the following formula (4), and "k" represents an integer of 2 to 6, (4)

wherein each $R^4$ is the same or different, and represents an alkyl group, a benzothiazolylsulfide group, a cycloalkyl group or a hydrogen atom.

26. The crosslinked rubber composition of claim 24, wherein the sulfur donator is caprolactam disulfide, and the sulfur atom-containing vulcanization accelerator releasing no sulfur is N-(tert-butyl)-2-benzothiazolylsulfeneamide.

27. The crosslinked rubber composition of claim 20, comprising a rubber component comprising a conjugated diene compound.

28. The crosslinked rubber composition of claim 20, wherein the low density region is a region having a density of 0.1 to 0.8 time the density of a crosslinked rubber composition before the elongation, and
wherein the void portion is a region having a density of 0 to 0.1 time the density of a crosslinked rubber composition before the elongation.

29. The crosslinked rubber composition of claim 20, wherein the volume of the low density region at elongation by an applied stress of 1.5 MPa is evaluated from a density distribution of the crosslinked rubber composition when extended using an X-ray computerized tomography, and wherein
the volume of the void portion at elongation by an applied stress of 3.0 MPa is evaluated from a density distribution of the crosslinked rubber composition when extended using an X-ray computerized tomography.

30. The crosslinked rubber composition of claim 29, wherein the density distribution of the crosslinked rubber composition when extended using an X-ray computerized tomography is evaluated with an evaluation device comprising a photographing means, the photographing means has an X-ray tube for irradiating an X-ray and a detector for detecting the X-ray and converting it into an electric signal, the detector has a phosphor for converting the X-ray into a visible light, and a decay time of the phosphor is 100 ms or less, and
wherein the density distribution of the crosslinked rubber composition when extended using an X-ray computerized tomography is evaluated with an evaluation device comprising a photographing means, the photographing means has an X-ray tube for irradiating an X-ray and a detector for detecting the X-ray and converting it into an electric signal, the detector has a phosphor for converting the X-ray into a visible light, and a decay time of the phosphor is 100 ms or less.

31. The crosslinked rubber composition of claim 30, wherein a luminance of the X-ray irradiated from the X-ray tube is $10^{10}$ photons/s/mrad$^2$/mm$^2$/0.1% bw or more.

32. A pneumatic tire comprising:
bead cores provided on a pair of right and left bead portions, respectively,
a carcass ply extending from a crown portion to the both bead portions through both side wall portions and moored to the bead cores,
an inner liner disposed at an inner side than the carcass ply in a direction of a tire diameter, and
a tread disposed at an outer side than the carcass ply in a direction of a tire diameter and composed of the crosslinked rubber composition of claim 21.

* * * * *